United States Patent
Meadows et al.

[11] Patent Number: 5,344,727
[45] Date of Patent: Sep. 6, 1994

[54] BIPOLAR BATTERY ELECTRODE

[75] Inventors: Clarence A. Meadows, Muncie; James R. Bish, Anderson; Robert E. Adams, Selma, all of Ind.

[73] Assignee: General Motors Corporation, Detroit, Mich.

[21] Appl. No.: 79,030

[22] Filed: Jun. 21, 1993

[51] Int. Cl.$^5$ .................... H01M 10/18; H01M 4/56
[52] U.S. Cl. ................... 429/210; 429/225; 429/228; 429/232; 429/245
[58] Field of Search ............... 429/210, 225, 228, 245, 429/233, 232

[56] References Cited

U.S. PATENT DOCUMENTS

| | | | |
|---|---|---|---|
| 266,089 | 10/1882 | Brush | 429/225 |
| 717,610 | 1/1903 | Paget | 429/210 |
| 859,753 | 7/1907 | Diamant | 429/225 X |
| 2,471,781 | 5/1949 | Schmidt | 136/12 |
| 3,728,158 | 4/1973 | Poe et al. | 136/10 |
| 4,178,216 | 12/1979 | Nordblom et al. | 204/2.1 |
| 4,275,130 | 6/1981 | Rippel et al. | 429/144 |
| 4,658,499 | 4/1987 | Rowlette | 29/623.1 |
| 4,758,473 | 7/1988 | Herscovici et al. | 429/210 X |

OTHER PUBLICATIONS

W. E. Rippel, "Bipolar Battery Using Conductive-Fiber Composite", NASA Tech Briefs, pp. 20, 22, Feb. 1989.

*Primary Examiner*—John S. Maples
*Attorney, Agent, or Firm*—Lawrence B. Plant

[57] ABSTRACT

A bipolar electrode for a Pb-acid battery comprising a lead septum plate and a porous coating on at least one face of the septum plate for anchoring at least the positive active material paste to the septum. The porous coating comprises multiple layers of lead particles fused together and to the septum face so as to define a plurality of interconnected, interstitial pores therebetween. The particles are fused droplets of lead arc-sprayed into the surface of the septum. A particular bipolar and battery construction useful with the bipolar electrode is disclosed.

8 Claims, 5 Drawing Sheets

BIPOLAR BATTERY ELECTRODE

This invention relates to a bipolar lead-acid storage battery, and more particularly to an electrode therefor and method of making same.

BACKGROUND OF THE INVENTION

Bipolar, batteries employ either one of two types of bipolar electrodes. The first, or face-to-face type of bipolar electrode, utilizes an electrolyte impervious, substantially planar, conductive septum having a first polarity active material on one face thereof and an opposite polarity active material on the opposite face thereof. Bipolar electrodes are typically held in frames of nonconductive material which isolate one cell from the next and which are stacked together (i.e., to form the battery) such that opposite polarity faces of adjacent electrodes oppose each other across in electrolyte-filled gap containing an electrolyte-permeable, dendrite-suppressing separators (e.g., microporous polyethylene, glass mat, microporous PVC, etc.). One such battery is exemplified by the patent to Poe et al U.S. Pat. No. 3,728,158, assigned to the assignee of the present invention.

It is known for the electrolyte-impervious, conductive septum that separates the opposite polarity active materials and one cell from the next to comprise (1) a thin plate of lead or alloy thereof (hereinafter referred to simply as lead), (2) electrically conductive polymer, or (3) a nonconductive polymer having a plurality of rivet-like conductors embedded therein for electrically communicating one face of the septum to the other. The electrically conductive polymers (e.g., metal filled plastics) tend to have poorer electrical conductivity than the lead plates, and the embedded conductor-type septums are costly to produce and susceptible to leakage of electrolyte between cells incident to poor sealing around the rivets. Accordingly, the use of solid lead plates is preferred for long-lived, high power bipolar batteries. One of the disadvantages of the use of lead plate septums, however, is poor adhesion of the active material (e.g., paste), and particularly the positive active material paste, to the lead plate. This problem becomes aggravated with cycling and results in a shortening of the useful life of the battery.

It is an object of the present invention to provide a unique bipolar battery electrode, and related battery, having a lead plate septum wherein at least the face of the septum that engages the positive active material is coated with a fused layer of lead particles for promoting improved adhesion of the positive active material paste to the septum. It is another object of the present invention to provide a process for improving the adhesion of at least the positive active material paste to a lead septum of a lead-acid, bipolar electrode. These and other objects and advantages of the present invention will become more readily apparent from the detailed description thereof which follows.

BRIEF DESCRIPTION OF THE INVENTION

In accordance with the electrode aspect of the present invention, there is provided a bipolar electrode for a lead-acid storage battery comprising an electrolyte impervious lead plate septum having an adherent, porous coating on at least on face thereof for securely anchoring a leady active material to such face. In a preferred embodiment, the adherent, porous coating is applied to both faces of the lead plate. The coating comprises multiple layers of lead particles fused to each other and to the face of the septum so as to define a plurality of interconnecting, interstitial pores therebetween. The coating has a thickness varying from about two (2) thousandths to about twenty (20) thousandths of an inch, comprises lead particles varying from about 10 microns to about 200 microns in diameter and has a porosity of about fifty percent (50%) by volume. Coatings having an average particle and pore size of about thirty (30) microns to about fifty (50) microns are particularly effective. A leady active material is pressed into the pores and overlays (i.e., is overpasted) the coating by about 10 thousandths to about 70 thousandths of an inch. The leady active material need only impregnate the outermost layers of the coating to anchor the paste to the face of the septum. Any unfilled pores beneath the paste-filled surface pores serve as a useful reservoir for electrolyte. In those situations where the coating is applied to only one face of the lead septum, the leady active material impregnating the coating will be positive polarity active material. The leady active material referred to herein is the active material paste commonly used in lead-acid storage batteries which comprises a PbO paste (i.e., in the unformed state), or, in the formed state, will comprise a $PbO_2$ positive active material or a Pb negative active material paste along with the other ingredients commonly used in such pastes. Electrodes made in accordance with the present invention are mounted in nonconductive frames and stacked together face-to-face and with monopolar electrodes at the ends of the stack to form a complete bipolar battery. The monopolar electrodes may comprise conventional battery plates (i.e., pasted grids) or preferably one of the lead septum plates pasted only on one face.

In accordance with the method aspect of the present invention a plurality of molten lead droplets are sprayed onto the face(s) of the lead septum. The droplets solidify as particles fused to the face(s) of the septum, and to one another, so as to provide a porous, multi-layered coating defining a plurality of interconnecting, interstitial pores between the particles. Thereafter, leady active material is pressed into the pores sufficient to anchor the active material to the coating. Spraying the droplets of molten lead onto the lead septum breaks-up any oxide film that might exist on the septum surface and promotes fusion of the droplets to the face of the septum.

In accordance with a preferred embodiment of the process invention, the droplets arc-sprayed onto the septum. That is to say, an electric arc is struck between a lead electrode and a counterelectrode (which may also be lead) while a stream of inert gas is flowed through the arc at a rate sufficient to disperse the molten lead into droplets and propel them against the face of the lead septum. The inert gas serves to blanket the molten lead particles and the lead septum and prevent oxidation thereof while at the elevated temperatures involved. Conventional arc-spraying guns such as Miller Thermal Model No. JK40 operated with argon pressures between about 30 psig and about 75 psig, current between about 40 amperes and about 120 amperes and voltages between about 18 volts and about 32 volts are effective to produce the desired coating. In this type of arc-spraying gun, two lead wire electrodes continuously fed toward each other within the gun create the arc. Lead wires comprising 0.45 Sn, 0.05 Ag and varying between about 1/16 and about ⅛ in diameter have been used successfully. Other techniques for spraying (e.g., flame spraying) the particles, or otherwise forming the particle coatings, may also be employed so long as the finished coating adheres to the septum and has the open cell porosity discussed above. The coating thus produced, unlike sandblasting or other surface roughening techniques, provides a significant number of undercut regions (i.e., pockets) which receive and firmly anchor the leady active material against separation from the septum.

In accordance with the battery aspect of the present invention, there is provided a bipolar battery comprising a stack of bipolar electrodes, of the type discussed above, each including a nonconductive frame engaging the periphery thereof. A nonconductive lattice engages the frame and overlays the faces of the septum so as to define a plurality of pockets thereover for receiving and retaining the leady active material. The several framed electrodes are stacked together face-to-face with opposite polarity active material on adjacent electrodes opposing one another across an electrolyte retention region therebetween. The electrolyte retention region is defined by appropriate means which also serves to space the bipolar electrodes apart. The spacer means may include a discrete frame member sandwiched between adjacent bipolar electrodes or, alternatively, flanges molded directly onto the electrode's frames. The several frames are stacked together and may be sealed one to the other to form the outer housing/casing for the battery, or preferably encased in a separate housing/casing. Preferably, the stack placed in a mold and the external housing/casing molded thereabout. Bipolar battery assemblies particularly useful with the electrodes of the present invention are described in more detail in copending U.S patent application Ser. No. 08/079,029 filed concurrently herewith.

DETAILED DESCRIPTION OF SPECIFIC EMBODIMENTS

The invention will be better understood when considered in the light of the following detailed description of a specific, preferred embodiment thereof which is given hereafter in conjunction with the several figures wherein.

Figure 1:
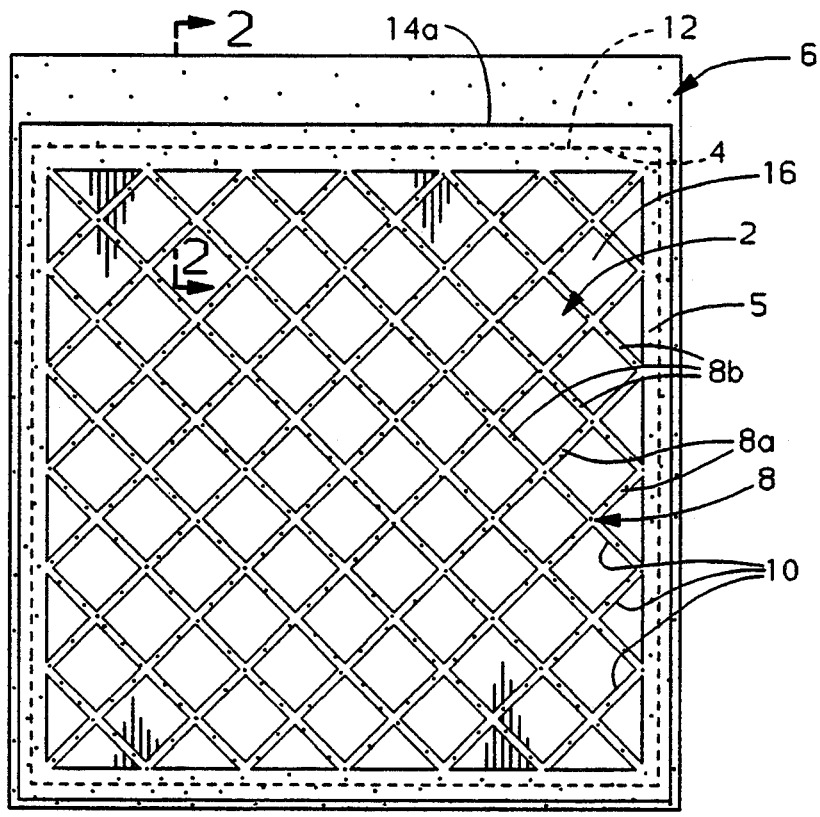
FIG. 1 is a front, elevational view of a bipolar electrode in accordance with the present invention.
Figure 2:
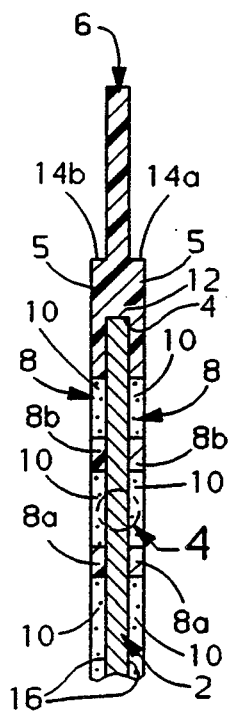
FIG. 2 is a sectioned, side elevational view in the direction 2—2 of FIG. 1.
Figure 3A:
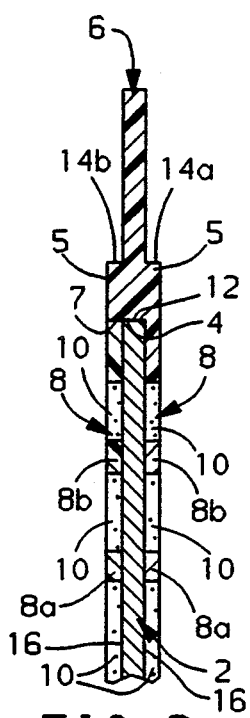
FIGS. 3a, 3b and 3c are views like FIG. 2 of alternative embodiments to the frame and lattice shown in FIG. 2.
Figure 3B:
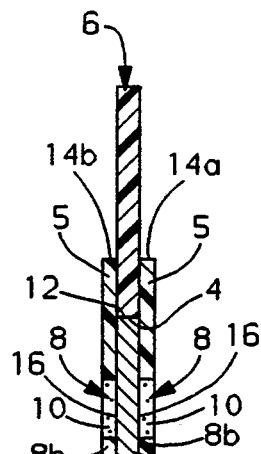
Figure 3C:
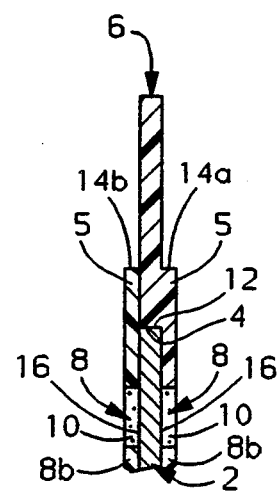
Figure 4:
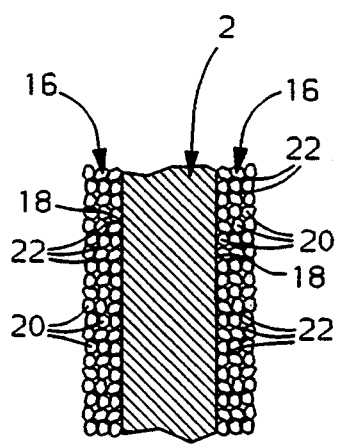
FIG. 4 is a magnified view of the zone 4 of FIG. 2.
Figure 5:
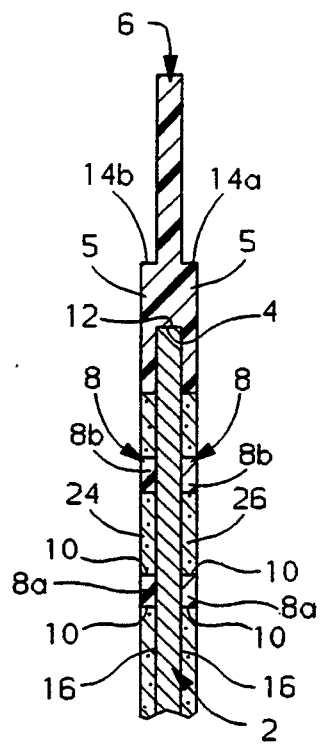
FIG. 5 is a view like that of FIG. 2, but having active material pasted on both sides of the electrode.

FIGS. 1-5 depict a bipolar electrode comprising a lead septum plate 2 encompassed by a nonconductive plastic frame 6 having an inner rim 4 engaging the periphery of the plate 2. The frame 6 is preferably insert molded about the plate by positioning the plate in a mold and molding the frame thereabout. Nonconductive (e.g., polyolefin) lattices 8 comprising a plurality of crisscrossing lattice wires 8a and 8b define a plurality of pockets 10 overlaying the faces on opposite sides of the septum plate 2. As shown in FIG. 2, the lattice 8 may be molded in one piece with the frame 6. Alternatively, and as shown in FIGS. 3a, 3b and 3c one or both of the lattices 8 may be molded separately from the frame 6 and subsequently made integral therewith by bonding (e.g., heat sealing, ultrasonically bonding, or adhesively bonding thereto). As shown in FIG. 2, the border 5 of the lattices 8 are molded together with the frame 6 around the edge 12 of the plate 2. As shown in FIG. 3a the edge 12 of the plate 2 is coextensive with the perimeters 7 of borders 5 of the lattices 8 and the frame 6 is then molded thereabout so as to bond to the perimeters 7 of the lattices 8. FIGS. 3b and 3c show other variations of the junction between the lattices borders 5 and the frame 6. Shoulder portions 14a and 14b are formed at the junction between the borders 5 of the lattices 8 and the frame 6, and extend completely around the lattices 8. Like mesas, the lattices 8 stand in relief above the faces 9a and 9b of the frame 6 and are sized to nest in a complementary-shaped recesses formed in a spacer frame (to be discussed hereinafter). Alternatively the discrete spacer frame may be eliminated and the electrode frame 6 widened in the direction normal to the septum to provide the electrolyte region and space the bipolar electrodes apart from each other.

In accordance with the present invention, a porous coating 16 is provided on at least one face 18 of the lead septum plate 2 which coating comprises multiple layers of lead particles 20 fused to each other, and to the face 18, so as to define a plurality of interconnecting interstitial pores 22 therebetween. The coating is formed by spraying a plurality of molten lead droplets onto the face 18 of the plate 2. The droplets will preferably be arc-sprayed whereby an arc is struck between a lead electrode and a counterelectrode (e.g., also comprising Pb), while an inert gas is flowed through the arc at a rate sufficient to dropletize the molten lead formed in the arc and propel it against the face 18 where the droplets fuse to the face 18 and to each other in such a manner as to provide a pebble-like coating of Pb particles bonded to each other and defining a plurality of interstitial voids 22. The inert gas will preferably comprise argon, or a mixture of argon and nitrogen, and serves to prevent oxidation of the droplets and the face 18 at the high temperatures involved. The septum plate 2 will be about 0.015 or more inches thick with the porous coating being about 0.002 to about 0.02 inches thick and comprising particles varying in size from about 10 microns to about 200 microns in diameter. Preferably, the average particle size will be about 50 microns. Impinging the hot droplets against the face 18 breaks up any oxides that might be formed on the surface thereof and promotes bonding of the droplets to the face 18.

The septum plate 2 is next mounted in the plastic frame 6. For the alternative shown in FIG. 2, the septum plate 2 is placed in an appropriate mold and a thermoplastic (e.g., polypropylene, polyethylene) comprising the frame 6 and lattice 8 injected thereabout in a single "insert-molding" operation. In the embodiment shown in FIG. 3a, the lattice(s) 8 are molded separately, sandwiched together with the plate 2, placed in a mold and encircled by the plastic forming the frame 6 injected thereabout. The frame plastic bonds to the lattice plastic to hold the assembly together. In the alternatives shown in FIGS. 3b and 3c, one or both of the lattices 8 is/are molded separately and then bonded to a face of the frame 6.

Following coating of the septum plate 2 and mounting in the frame/lattices, a leady active material 24 having a first polarity and leady active material 26 having a second polarity is spread into the pockets 10 of the lattice 8, and pressed into the coating 16 so as to impregnate the pores 22 thereof sufficiently to anchor the leady material to the coating 16 throughout the life of the battery. Preferably, both faces of the septum plate 2 are coated with the lead particles, and both the positive and the negative active materials pressed into the interstices thereof. Otherwise, only the positive active material is pressed into the pores 22 of a coating 16 formed on one side of the septum plate 2. The lattice 8 may be either flush pasted or over-pasted (i.e., the thickness of the paste is greater than the thickness of the lattice wires 8a, 8b).

Figure 6:
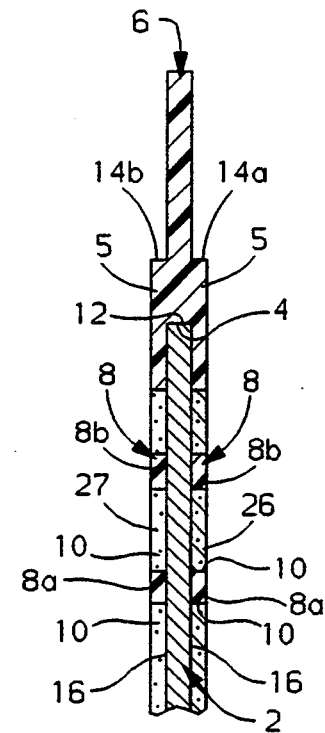
FIG. 6 is a view like FIG. 5, but with active material pasted on only one face of the electrode to form a monopolar electrode.

As best shown in FIG. 6, the same framed electrode as discussed above may be used as a monopolar electrode (i.e., in the end cells of the battery) by pasting only one side thereof with active material paste 26. In the end cell, the pasted side 26 will confront an opposite polarity face of adjacent bipolar electrolyte, while the unpasted face 27 will confront the end wall of the battery. At one end of the battery, the active material paste on the monopolar electrode will comprise positive active material, and at the other end of the battery, the active material paste on the monopolar electrode will comprise negative active material. Alternatively conventional pasted grid-type monopolar electrodes mounted in an appropriate frame may be used in the end cells.

Figure 7:
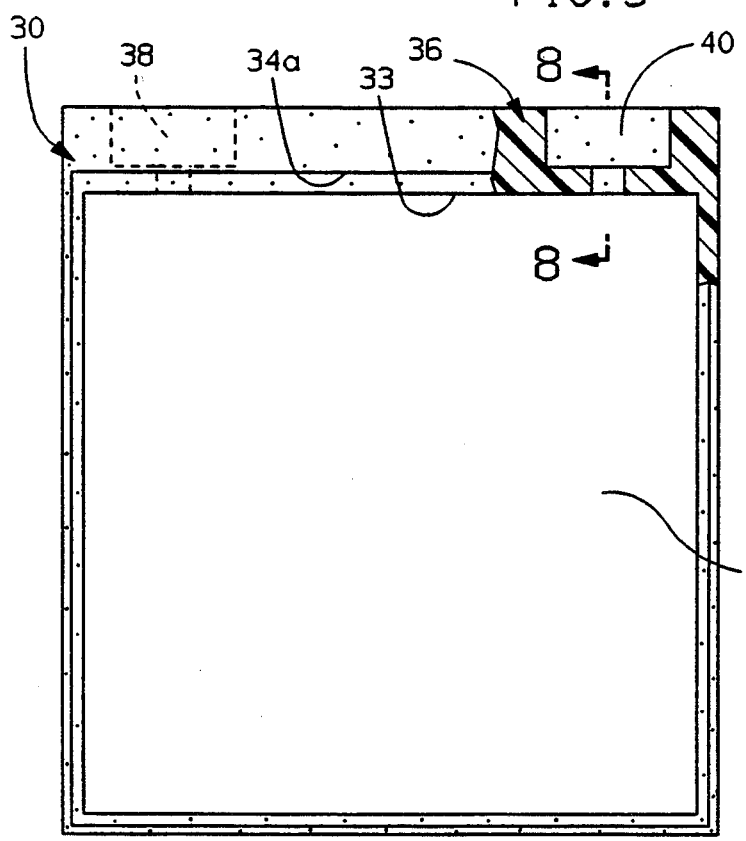
FIG. 7 is a partially sectioned, front, elevational view of a interelectrode, spacing frame.
Figure 8:
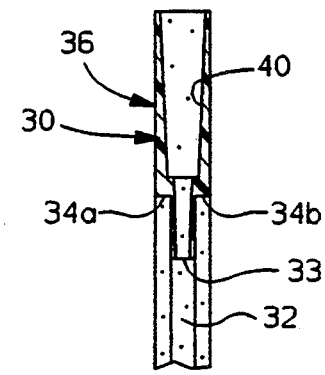
FIG. 8 is a view in the direction 8—8 of FIG. 7.

FIGS. 7 and 8 depict a spacer frame 30 which, in the finished battery, serves to space one bipolar electrode 2 from the next adjacent electrode (i.e., bipolar or monopolar) in the battery, and to define a region 32 between opposing faces of the adjacent electrodes for containing the battery's electrolyte and interplate separator (e.g., compressed gas recombinant type glass mat 58 such as described in U.S. Pat. No. 3,862,861). For convenience of handling and assembly, it is desirable to mold the edges of the separator (e.g., glass mat 58) directly into the frame 30, (not shown). The spacer frame 30 contains annular recesses 34a and 34b along the inner rim 33 thereof sized to receive, in nesting fashion, the shoulders 14a and 14b defining the mesa-like lattices 8 for interlocking the several frames 6 securely together. The upper leg 36 of the spacer frame 30 includes openings 38 and 40 therein for admitting electrolyte into the region 32 and/or for appropriately venting the battery as may be required after the cell stack has been assembled.

Figure 9:
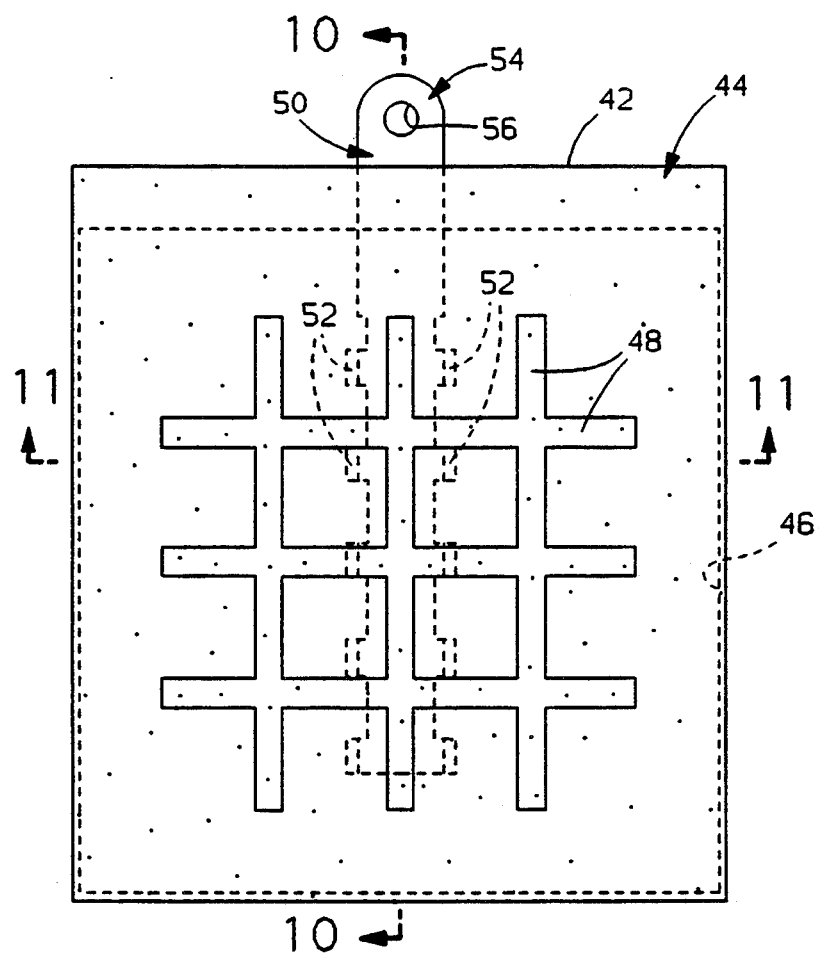
FIG. 9 is a front elevational view of an end wall of a bipolar battery.
Figure 10:
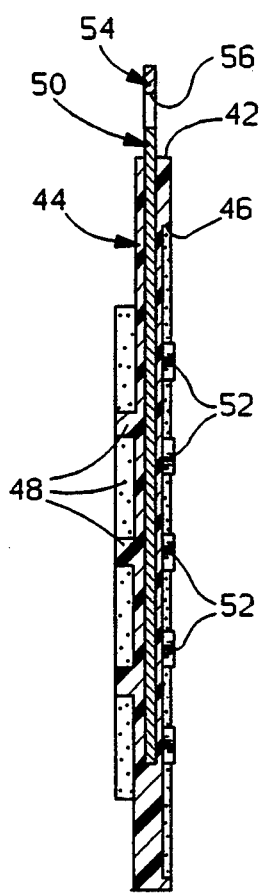
FIG. 10 is a view in the direction 10—10 of FIG. 9.
Figure 11:
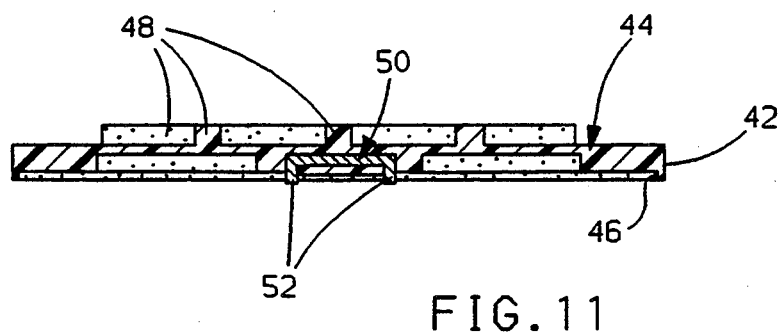
FIG. 11 is a view in the direction 11—11 of FIG. 9.

FIGS. 9-11 depict an end wall 44 of a bipolar electrode stack. The wall 44 comprises a nonconductive (e.g., polyolefin) material having a recess 46 therein adapted to receive a shoulder 14a or 14b of one of the monopolar electrodes discussed above (see FIG. 6). A plurality of crisscrossing ribs 48 on the outside of the wall 44, opposite the recess 46, stiffen the end wall 44 and prevent bulging thereof. A metal blade 50 having a plurality of tangs 52 projecting outwardly therefrom, and inwardly of the battery, is insert-molded into the wall 44 and extends beyond the peripheral edge 42 thereof to form a terminal 54 for the battery. The terminal 54 has an appropriate aperture 56 therein adapted to receive a bolt, or the like, for connecting to an external electrical circuit. The tangs 52 projecting from the blade 50 extend into contact with the unpasted face of the lead septum plate 2 and are induction welded thereto after the stack has been assembled. The blade 50 will preferably comprise tin-coated or Pb/Sn-coated copper wherein the Sn or Pb/Sn coating promotes bonding to the plastic forming the wall 44, and welding to the septum plate 2 during induction welding.

Figure 12:
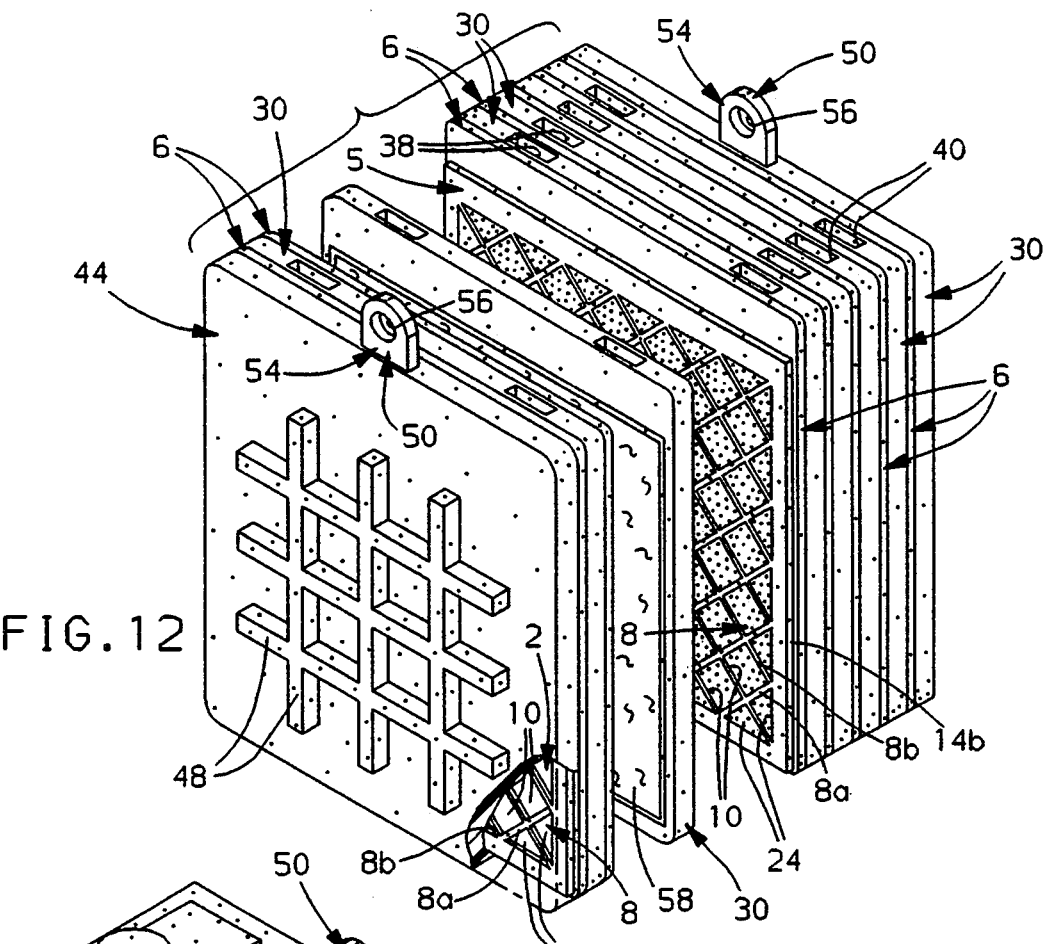
FIG. 12 is an exploded view of a bipolar battery stack.
Figure 13:
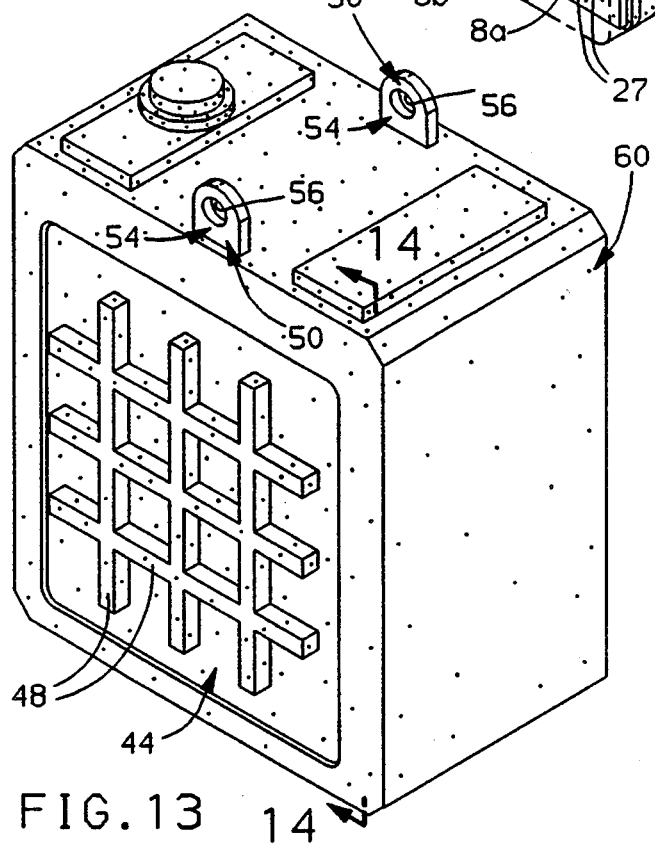
FIG. 13 is a perspective view of a bipolar battery in a separate housing.
Figure 14:
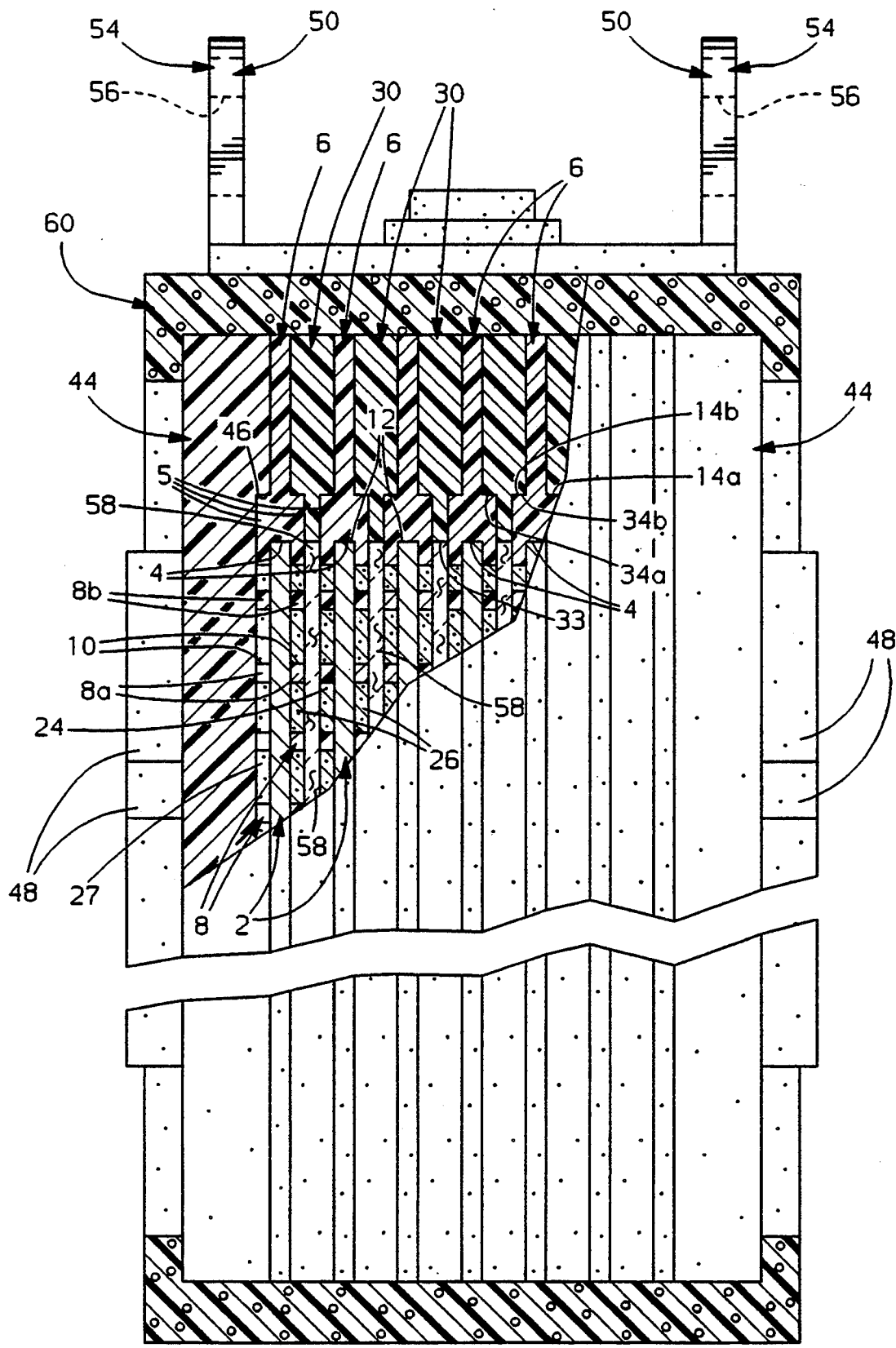
FIG. 14 is a sectioned, side view in the direction 14—14 of FIG. 13.

The several frames may be sealingly bonded one to the other to form the battery's housing. However, FIGS. 12-14 shows a preferred embodiment of a bipolar electrode stack before and after encasement in a separate housing. FIG. 12 shows how the end walls 44 and several electrode and spacer frames nest one within the other to form a bipolar electrode stack. FIG. 12 also shows a microporous glass mat separator 58 positioned within the spacer frame 30 prior to assembly of the stack. In accordance with a preferred embodiment, the assembled stack is held together in an appropriate mold and molten plastic (e.g., polypropylene, polyethylene) injected thereabout to form the outer housing 60 which embeds the frames and holds them all together as described in more detail in copending U.S. patent application Ser. No. 08/079,033 assigned to the assignee of the present invention (see FIGS. 13 and 14). The injected plastic will preferably contain about 20% by weight of a foaming agent (e.g., F-CL Foaming Agent sold by Wilson Fiberfill International) and is injected under low pressure about the stack. At temperatures in excess of 350° F. the foaming agent produces CO, $CO_2$ and ammoniacal foaming gases which expand and foam the plastic to fill the mold cavity without subjecting the stack to high molding pressures used during injection molding. The resulting containers will have a porosity of about 20% by volume.

While the invention has been disclosed primarily in terms of specific embodiments thereof it is not intended to be limited thereto, but rather only to the extent set forth hereafter in the claims which follow.

The embodiments of the invention in which an exclusive property or privilege is claimed are defined as follows.

1. A pasted bi-polar electrode for a Pb-acid storage battery comprising:
   an electrolyte-impervious, lead septum;
   a highly porous coating comprising multiple layers of lead particles fused to each other and to at least one face of said septum so as to define a plurality of interconnecting, interstitial pores therebetween, said pores being of sufficient size to receive and retain leady active material paste pressed thereinto;
   a first leady active material paste overlaying said coating and impregnating at least a portion of said pores; and
   a second leady active material overlaying and adhering to a second face of said septum opposite said one face.

2. A bipolar electrode according to claim 1 wherein said first leady active material comprises $PbO_2$ and said second leady active material comprises Pb.

3. A bipolar electrode according to claim 1 wherein said coating also covers said second face.

4. A bipolar electrode according to claim 1 wherein said particles are solidified droplets of molten lead sprayed onto said septum.

5. A bipolar electrode according to claim 4 wherein said molten metal is arc-sprayed onto said septum.

6. A bipolar electrode according to claim 5 wherein said coating has a thickness of about 0.002 to about 0.02 inches.

7. A bipolar electrode according to claim 5 wherein said particles vary in size from about 10 microns to about 200 microns.

8. A bipolar electrode according to claim 7 wherein the average size of said pores is about 30 microns to about 50 microns.

* * * * *